(12) United States Patent
Li

(10) Patent No.: US 12,408,231 B2
(45) Date of Patent: *Sep. 2, 2025

(54) INFORMATION PROCESSING METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 566 days.

This patent is subject to a terminal disclaimer.

(21) Appl. No.: 17/778,596

(22) PCT Filed: Nov. 27, 2019

(86) PCT No.: PCT/CN2019/121372
§ 371 (c)(1),
(2) Date: May 20, 2022

(87) PCT Pub. No.: WO2021/102761
PCT Pub. Date: Jun. 3, 2021

(65) Prior Publication Data
US 2023/0007724 A1  Jan. 5, 2023

(51) Int. Cl.
*H04W 76/28* (2018.01)
(52) U.S. Cl.
CPC .................. *H04W 76/28* (2018.02)
(58) Field of Classification Search
CPC .................. H04W 76/28; Y02D 30/70
See application file for complete search history.

(56) References Cited

U.S. PATENT DOCUMENTS

| | | | |
|---|---|---|---|
| 2013/0163497 A1* | 6/2013 | Wei | H04L 5/001 370/311 |
| 2013/0301500 A1 | 11/2013 | Koc et al. | |
| 2015/0105062 A1 | 4/2015 | Quan et al. | |
| 2017/0019820 A1* | 1/2017 | Das | H04W 48/20 |
| 2018/0343686 A1* | 11/2018 | Manepalli | H04W 76/28 |
| 2019/0274184 A1 | 9/2019 | Yue et al. | |
| 2019/0380166 A1* | 12/2019 | Xie | H04W 76/28 |

(Continued)

FOREIGN PATENT DOCUMENTS

| | | |
|---|---|---|
| CN | 102421148 A | 4/2012 |
| CN | 102625421 A | 8/2012 |

(Continued)

OTHER PUBLICATIONS

Chinese Office Action issued on Sep. 30, 2022 for Chinese Patent Application No. 2019800032728.

(Continued)

*Primary Examiner* — Abdullahi E Salad
(74) *Attorney, Agent, or Firm* — Volpe Koenig

(57) ABSTRACT

An information processing method for a communication system based on cellular mobile communication, and performed by a User Equipment UE, the method including: reporting assistant information for at least one Discontinuous Reception (DRX) group among at least two DRX groups, the assistant information indicating an expected DRX configuration for the DRX group (S110).

18 Claims, 5 Drawing Sheets

(56) References Cited

U.S. PATENT DOCUMENTS

2020/0021952 A1* 1/2020 Koudouridis ....... H04W 72/542
2020/0045768 A1* 2/2020 He .................... H04W 52/0216

FOREIGN PATENT DOCUMENTS

| CN | 104285387 A | 1/2015 |
|---|---|---|
| CN | 104602328 A | 5/2015 |
| CN | 107241678 A | 10/2017 |
| CN | 108924857 A | 11/2018 |
| CN | 109451842 A | 3/2019 |
| WO | 2008111684 A1 | 9/2008 |
| WO | 2013168891 A1 | 11/2013 |

OTHER PUBLICATIONS

ZTE Corporation, "DRX Enhancements for Power Saving", 3GPP TSG_RAN\WG2_RL2, TSGR2_77bis, R2-121257, Mar. 20, 2012.

* cited by examiner

INFORMATION PROCESSING METHOD AND APPARATUS, COMMUNICATION DEVICE, AND STORAGE MEDIUM

CROSS-REFERENCE TO RELATED APPLICATION

The present application is a National Stage of International Application No. PCT/CN2019/121372, filed on Nov. 27, 2019, the entire contents of which are incorporated by reference herein in their entireties for all purposes.

BACKGROUND

A terminal is configured with a Discontinuous Reception (DRX) cycle under a DRX mechanism in a connected state. FIG. 1 is a schematic diagram of a DRX cycle. It can be seen that the DRX cycle includes an activation time and a sleep time. During the activation time, a corresponding DRX group is in an activation state and may be configured to transmit and receive information on a corresponding carrier. During the sleep time, a corresponding DRX group is in a sleep state. The power consumption of the terminal when there is a DRX group in the sleep state is lower than the power consumption when there is no DRX group in the sleep state.

For example, a DRX group in the activation state of the terminal may monitor a Physical Downlink Control Channel (PDCCH) on a corresponding carrier to receive PDCCH signaling. The PDCCH signaling here may include Downlink Control Information (DCI).

SUMMARY

Examples of the present disclosure provide an information processing method and apparatus, a communication device, and a storage medium.

According to a first aspect of an example of the present disclosure, there is provided an information processing method. The information processing method is performed by a user equipment (UE), and includes:
 reporting assistant information for at least one Discontinuous Reception (DRX) group among at least two DRX groups, the assistant information indicating an expected DRX configuration for the DRX group.

According to a second aspect of an example of the present disclosure, there is provided an information processing method. The information processing method is performed by a base station, and includes:
 receiving assistant information, reported by a UE, for at least one DRX group among at least two DRX groups, the assistant information indicating an expected DRX configuration for the DRX group.

According to a third aspect of an example of the present disclosure, there is provided a communication device, including:
 a transceiver;
 a memory; and
 a processor, the processor is connected to the transceiver and the memory respectively, and is configured to control the transceiver to transmit and receive wireless signals by executing computer-executable instructions on the memory, and is able to implement the information processing method according to the first aspect or the second aspect.

According to a fourth aspect of an example of the present disclosure, there is provided a non-transitory computer-readable storage medium. The computer-readable storage medium stores computer-executable instructions. The computer-executable instructions are able to implement the information processing method according to the first aspect or the second aspect after being executed by a processor.

DETAILED DESCRIPTION

The network architecture and service scenarios described in the examples of the present disclosure are for the purpose of illustrating the technical solutions of the examples of the present disclosure more clearly, and do not constitute a limitation on the technical solutions provided by the examples of the present disclosure. Those of ordinary skill in the art may recognize that with the evolution of the network architecture and the emergence of new service scenarios, the technical solutions provided by the examples of the present disclosure are also applicable to similar technical problems.

Figure 1:
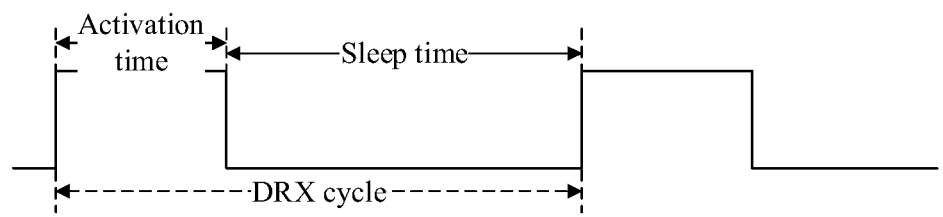
FIG. 1 is a schematic diagram of a DXR cycle.
Figure 2:
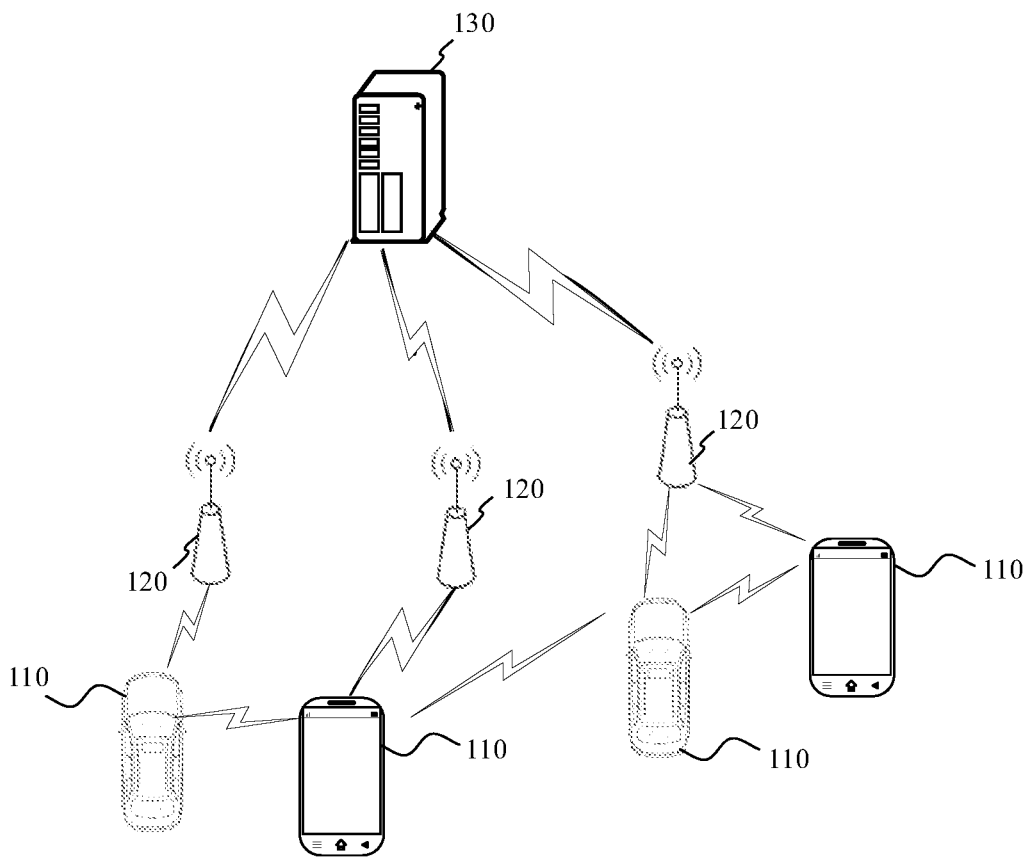
FIG. 2 is a schematic structural diagram of a wireless communication system.

Please refer to FIG. 2 which is a schematic structural diagram of a wireless communication system according to an example of the present disclosure. As shown in FIG. 2, the wireless communication system is a communication system based on cellular mobile communication technology, and may include more than one terminals 110 and more than one base stations 120.

The terminals 110 may be devices providing at least one of voice and data connectivity to a user. The terminals 110 may communicate with one or more core networks via a Radio Access Network (RAN). The terminals 110 may be Internet of Things terminals, such as sensor devices, mobile phones (or "cellular" phones), and computers with Internet of Things terminals, such as fixed, portable, pocket, hand-held, computer built-in or vehicle-mounted devices. For example, the terminals 110 may be stations (STAs), subscriber units, subscriber stations, mobile stations, mobiles, remote stations, access points, remote terminals, access terminals, user terminals, user agents, user devices, or user equipment. Or, the terminals 110 may be devices of an unmanned aerial vehicle. Or, the terminals 110 may be vehicle-mounted devices, such as trip computers with a wireless communication function, or wireless terminals connected to an external trip computer. Or, the terminals 110 may be roadside devices, such as streetlights and signal lights with a wireless communication function.

The base stations 120 may be network-side devices in the wireless communication system. The wireless communication system may be a 4th generation mobile communication (4G) system which is also referred to as a Long Term Evolution (LTE) system, or a 5G system which is also referred to as a new radio (NR) system or 5G NR system, or a next-generation system of the 5G system. An access network in the 5G system may be referred to as a New Generation-Radio Access Network (NG-RAN).

The base stations 120 may be evolved base stations (eNBs) in the 4G system, or base stations with centralized distributed architecture (gNBs) in the 5G system. In general, each base station 120 with the centralized distributed architecture includes a central unit (CU) and at least two distributed units (DUs). The central unit is provided with protocol stacks of a Packet Data Convergence Protocol (PDCP) layer, a Radio Link Control (RLC) protocol layer, and a Media Access Control (MAC) layer. The distributed units are provided with protocol stacks of a physical (PHY) layer. The implementation manner of the base stations 120 is not limited in the example of the present disclosure.

A wireless connection may be established between the base stations 120 and the terminals 110 through wireless radio. In different implementations, the wireless radio is wireless radio based on the standard of the 4th generation mobile communication network technology (4G), or wireless radio based on the standard of the 5th generation mobile communication network technology (5G), for example, new radio, or wireless radio based on the standard of next-generation mobile communication network technology of 5G.

In some examples, an End to End (E2E) connection may also be established between the terminals 110, for example, vehicle to vehicle (V2V) communication, vehicle to infrastructure (V2I) communication and vehicle to pedestrian (V2P) communication in vehicle to everything (V2X) communication.

In some examples, the above wireless communication system may further include a network management device 130.

The more than one base stations 120 are respectively connected to the network management device 130. The network management device 130 may be a core network device in the wireless communication system. For example, the network management device 130 may be a Mobility Management Entity (MME) in an Evolved Packet Core (EPC), or other core network devices, such as a Serving Gateway (SGW), a Public Data Network Gateway (PGW), a Policy and Charging Rules Function (PCRF) unit, or a Home Subscriber Server (HSS). The implementation form of the network management device 130 is not limited in the example of the present disclosure.

Figure 3:
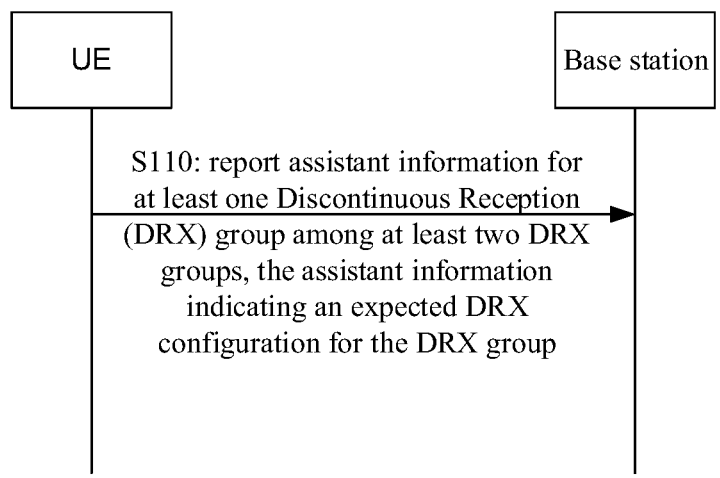
FIG. 3 is a schematic flow diagram of an information processing method according to an example of the present disclosure.

As shown in FIG. 3, there is provided an information processing method according to an example. The information processing method is performed by a user equipment (UE), and includes:

S110: assistant information for at least one Discontinuous Reception (DRX) group among at least two DRX groups is reported. The assistant information indicates an expected DRX configuration for the DRX group.

The UE may be various types of UE, such as Machine Type Communication (MTC) UE or Internet of Things (IoT) UE.

According to the present disclosure, one UE may be configured with at least two DRX groups, and different DRX groups may correspond to different carriers. For example, carriers corresponding to DRX groups needing to report carrier information respectively may be non-contiguous carriers according to an example of the present disclosure.

The different DRX groups may correspond to different functional structures in the UE. In response to a DRX group entering an activation state, for example, entering an activation time of a DRX cycle corresponding to the DRX group, a functional structure configured to the DRX group by the UE exits a sleep state and enters the activation state. If a DRX group is in the sleep state, a functional structure configured to the DRX group by the UE is also in the sleep state, such that the power consumption of the UE is saved.

The functional structure may include a transceiver in the UE, such as a Radio Frequency Chain. For another example, the functional structure may include a Base Band Processor (BP) in the UE, and so on.

In the example of the present disclosure, when the UE finds that a current DRX configuration for a DRX group is inappropriate, the UE may automatically report assistant information indicating a DRX configuration expected by the UE.

By reporting the assistant information, a base station may know the DRX configuration, expected by the UE at present, for the DRX groups, such that the UE may adjust the DRX configuration for each DRX group in time according to the power consumption and data transmission requirements of the UE. In this way, the power consumption of the UE is reduced as much as possible while low-latency transmission of data of the UE is ensured.

In some examples, after the assistant information for one or more DRX groups is reported to the base station, the base station may adjust the DRX configuration for the DRX groups of the UE according to the assistant information. After the base station adjusts the DRX configuration for the DRX groups of the UE, the base station may send configuration information for the adjusted DRX configuration to the UE such that the base station may communicate with the UE subsequently according to the adjusted DRX configuration via corresponding DRX groups.

In other examples, after the assistant information for one or more DRX groups is reported to the base station, the base station may determine whether to validate the expected DRX configuration according to current system conditions of an entire cell or a wireless communication system. If it is determined to validate the expected DRX configuration, a current DRX configuration for a corresponding DRX group is changed to the expected DRX configuration. Otherwise, the current DRX configuration for the corresponding DRX group may be maintained.

The DRX configuration here may include any configuration for the DRX cycle or any configuration for at least one of the activation time and the sleep time of the DRX groups. For example, the DRX configuration may include a configuration for various timers for the DRX groups, such as a timing configuration for one or more of a DRX activity timer, a DRX Inactivity Timer, a DRX downlink retransmission timer, and a DRX uplink retransmission timer.

In some examples, the timers for the DRX groups may further include a DRX short cycle timer.

When the timers are in a timing state, corresponding DRX groups are all in the activation state. When the timers expire, the corresponding DRX groups enter the sleep state.

In the example of the present disclosure, conditions for triggering the UE to report the assistant information may include at least one of the following:

in response to an expected DRX configuration for a DRX group needing to be reported for the first time, it is determined to trigger the reporting of the assistant information for the corresponding DRX group; and in response to a current DRX configuration for a DRX group not being the DRX configuration expected by the UE (namely the above expected DRX configuration), it is determined to trigger the reporting of the assistant information for the DRX group.

Determining, in response to the current DRX configuration for the DRX group not being the DRX configuration expected by the UE (namely the above expected DRX configuration), to trigger the reporting of the assistant information for the DRX group includes a case as follows: in response to it being determined that the expected DRX configuration for the DRX group has changed after the UE reports assistant information for the DRX group, but has not yet obtained a DRX configuration updated based on assistant information reported last time, it is determined to trigger the reporting of the assistant information for the DRX group.

Figure 4A:
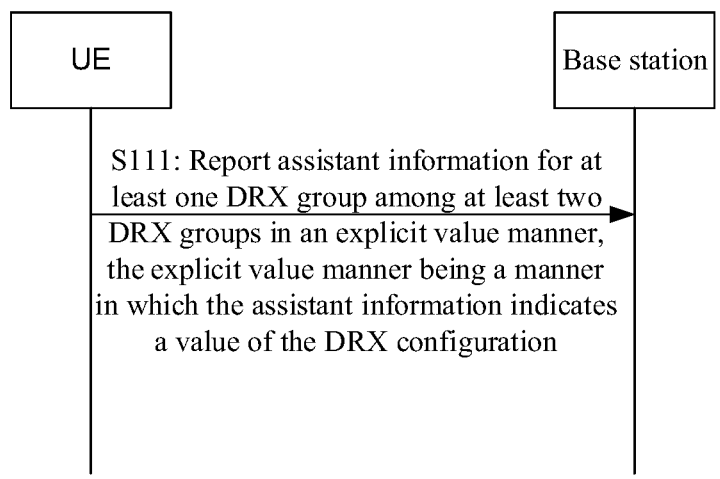
FIG. 4A is a schematic flow diagram of an information processing method according to an example of the present disclosure.

In some examples, as shown in FIG. 4A, S110 may include:

S111: the assistant information for the at least one DRX group among the at least two DRX groups is reported in an explicit value manner. The explicit value manner is a manner in which the assistant information indicates a value of the DRX configuration.

The explicit value manner is a manner of directly indicating the value of the expected DRX configuration via the assistant information. In this way, after the base station receives the assistant information, in response to it being determined to replace the current DRX configuration for the DRX group with the expected DRX configuration, a DRX configuration corresponding to the DRX group in the base station may be directly modified.

In some examples, the assistant information for the at least one DRX group among the at least two DRX groups is reported in an increment manner. The increment manner is a manner in which the assistant information indicates an increment value of the DRX configuration.

Figure 4B:
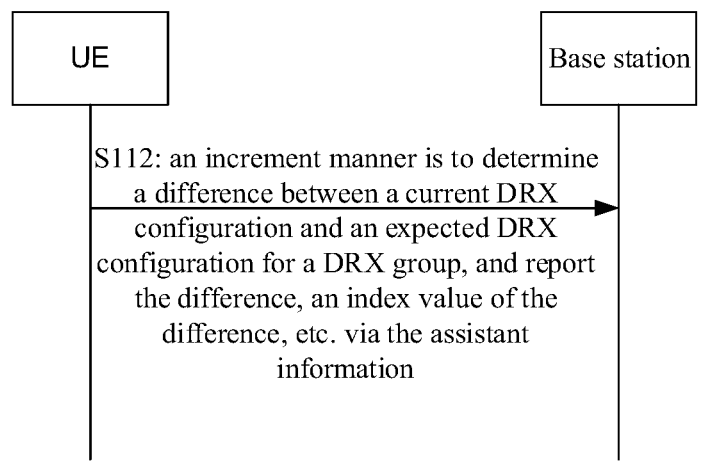
FIG. 4B is a schematic flow diagram of an information processing method according to an example of the present disclosure.

As shown in FIG. 4B, S110 may include:

S112: The increment manner is to determine a difference between the current DRX configuration and the expected DRX configuration for the DRX group, and report the difference, an index value of the difference, etc. via the assistant information.

Information content reported by the assistant information is different for the explicit value manner than for the increment manner. During the implementation, the assistant information may be reported in any manner.

For example, in response to the quantity of values of the DRX configurations being limited and a value difference between the more than one DRX configurations being constant, an index of the increment value may be configured to complete the reporting of the assistant information with fewer bits and to reduce signaling overheads.

In some examples, reporting assistant information for at least one Discontinuous Reception (DRX) group among at least two DRX groups includes one of the following:

reporting the assistant information for all the DRX groups at one time via a first message;

reporting the assistant information for at least one DRX group via a second message including more than one reporting field, where each reporting field is configured to carry the assistant information for one DRX group; and reporting the assistant information for different DRX groups via different third messages respectively.

For example, the first message may report the assistant information for all the DRX groups in the UE at one time. For example, if the UE currently includes 2 DRX groups, for example, a DRX group 1 and a DRX group 2, in response to the DRX group 1 having an expected DRX configuration different from a current DRX configuration, even if a current DRX configuration for the DRX group 2 is the expected DRX configuration for the DRX group 2, both assistant information for the DRX group 1 and assistant information for the DRX group 2 need to be carried by the first message for reporting if the first message is used for reporting.

The second message may include the more than one reporting fields, and each reporting field may be configured to report assistant information for one DRX group. Only assistant information for the DRX groups needing to be reported may be reported in the second message. For example, in response to the expected DRX configuration for the DRX group 1 being inconsistent with the current DRX configuration for the DRX group 1 and the current DRX configuration for the DRX group 2 being the expected DRX configuration for the DRX group 2, the second message may carry the assistant information for the DRX group 1 through one reporting field, or, the second message may carry two reporting fields, one reporting field carrying the assistant information for the DRX group 1 and the other reporting field being null or carrying a preset value but not carrying the assistant information for the DRX group 2. The preset value here may be: an all "0" sequence or an all "1" sequence, or a cross sequence of "0" and "1" arranged in a preset sorting manner. From the UE side, reducing the quantity of reporting fields or reducing the reporting fields corresponding to the DRX groups that do not need to report assistant information can simplify encoding on the UE side and reduce the power consumption caused by modulation, encoding and reporting of the assistant information on the UE side.

In other examples, a mapping relationship is established between each reporting field and one corresponding DRX group. In response to the UE being configured with M DRX groups, the second message has M reporting fields, and the M reporting fields correspond to the numbers of the DRX groups in sequence. In this way, when the UE encodes and reports the assistant information, the assistant information for corresponding DRX groups needs to be filled in corresponding reporting fields of the second message. After receiving the second message, the base station may determine which DRX group the assistant information carried by the reporting fields belongs to according to the mapping relationship between the reporting fields and the DRX groups. In this case, the mapping relationship is a fixed mapping relationship, and is known by both the UE and the base station.

In some examples, in response to a current DRX configuration for one DRX group being not the expected DRX configuration, a corresponding reporting field of the second message carries the assistant information. In this case, the second message may carry the assistant information for the DRX group whose current DRX configuration is not the expected DRX configuration.

In some examples, in response to a current DRX configuration for one DRX group being expected to be cancelled, a corresponding reporting field in the second message is null or a first predetermined value. In this case, under the condition that a current DRX configuration for one DRX group needs to be maintained, a corresponding reporting field in the second message may be a third predetermined value.

In other examples, in response to a current DRX configuration for one DRX group being expected to be maintained, a corresponding reporting field in the second message is null or a second predetermined value. In this case, under the condition that a current DRX configuration for one DRX group needs to be cancelled, a corresponding reporting field in the second message may be a fourth predetermined value.

In some examples, in response to a current expected DRX configuration for one DRX group being different from a DRX configuration indicated by the assistant information reported last time, a corresponding reporting field of the second message carries the assistant information.

In other examples, in response to current reporting being the first reporting for one DRX group, a corresponding reporting field of the second message carries the assistant information.

In some examples, reporting the assistant information for at least one DRX group via the second message including more than one the reporting fields includes:
 reporting the assistant information for the different DRX groups respectively via the second message capable of carrying an identifier indication bit. The identifier indication bit is configured to indicate the DRX group for which the assistant information is reported.

In response to a reporting field in the second message being not fixedly mapped to a corresponding DRX group, for example, in response to a reporting field in the m-th position in the second message being not fixedly mapped to a DRX group m of the UE, the second message may carry the identifier indication bit to indicate which DRX group the assistant information in the current second message belongs to.

In this way, in some examples, since the second message only carries part of the DRX groups of the UE via one or more reporting fields, the DRX groups with the assistant information being reported are indicated via the identifier indication bit. It is certain that the second message may carry the identifier indication bit, but the second message may not carry the identifier indication bit in the specific reporting process.

In some examples, one UE includes M DRX groups, the identifier indication bit may include M bits, and one bit indicates one DRX group. For example, two bit values (i.e., "0" and "1") of one bit in the identifier indication bit corresponding to the DRX groups indicate two states, namely whether the assistant information for the DRX groups is carried or not.

For example, assuming that M is equal to 2, the current value of the identifier indication bit is "10", and "0" indicates that the assistant information for the corresponding DRX group is not carried, it indicates that the current second message carries the assistant information for the DRX group 1 but does not carry the assistant information for the DRX group 2.

In some examples, the identifier indication bit may precede all the reporting fields. For example, in some examples, the reporting fields are located within the body of the second message, and the identifier indication bit may be located in the header of the second message.

In yet other examples, one or more identifier indication bits are configured to indicate the DRX groups corresponding to one reporting field. In this case, the identifier indication bits may be located adjacent to the corresponding reporting field, for example, the identifier indication bits are located in front of the corresponding reporting field.

In some examples, the DRX groups include a first DRX group and a second DRX group.

In response to the assistant information carried by the second message belonging to the first DRX group, the identifier indication bit included in the second message is a default value, the second message carries no identifier indication bit, or the identifier indication bit included in the second message is a group identifier of the first DRX group.

In response to the assistant information carried by the second message belonging to the second DRX group, the identifier indication bit included in the second message is a group identifier of the second DRX group.

For example, in some examples, the UE is configured with different DRX groups among which there are DRX groups with a high frequency of usage, and DRX groups with a low frequency of usage. In this case, the first DRX group may be a DRX group with a high frequency of usage, and the second DRX group may be a DRX group with a low frequency of usage.

For another example, the first DRX group may be a primary DRX group, and the second DRX group may be a secondary DRX group. A carrier corresponding to the primary DRX group is a primary carrier, and a carrier corresponding to the secondary DRX group may be a secondary carrier.

In this way, the frequency of changing the DRX configuration for the first DRX group is higher. In order to reduce the bit overheads of the second message, or reduce the encoding complexity of the second message, the indication bit included in the second message may be set to be the default value in response to the assistant information carried by the second message being the assistant information for the first DRX group. It is certain that the second message may also directly carry the group identifier of the first DRX group in response to the assistant information carried by the second message belonging to the first DRX group. For example, in response to the assistant information for the first DRX group needing to be quickly reported, the identifier indication bit may carry encoding information corresponding to the default value. Since the encoding information corresponding to the default value may be pre-encoded, the transmission rate may be increased. In the example of the present disclosure, the group identifier of each DRX group may be, but is not limited to, the number of the DRX group.

In some examples, the example of the present disclosure provides three types of messages for the UE to report the assistant information. The UE may select one from the first message, the second message and the third message according to provisions in a communication protocol, an instruction of the base station or negotiations with the base station to report the assistant information.

In other examples, the UE may also determine and select a message suitable for the current reporting scenario according to the reporting requirement of the current assistant information. For example, the first message may be selected in response to all the DRX groups having assistant information to be reported currently. For another example, the third message may be used in response to the UE being configured with a large quantity of DRX groups and currently only one or a small quantity of DRX groups having assistant information to be reported. For yet another example, the UE may use the second message for reporting in response to the quantity of DRX groups with assistant information needing to be reported being constant currently.

Figure 5:
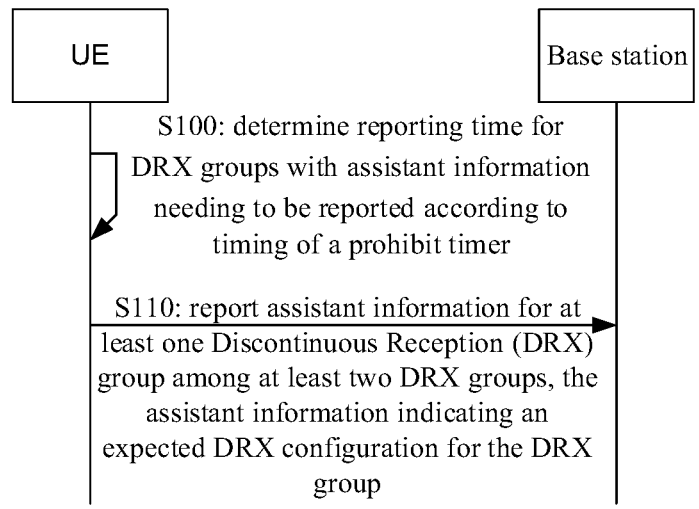
FIG. 5 is a schematic flow diagram of an information processing method according to an example of the present disclosure.

In some examples, as shown in FIG. 5, the method further includes:

S100: a reporting time for the DRX groups with the assistant information needing to be reported is determined according to timing of a prohibit timer.

In the example of the present disclosure, the confusion of wireless transmission caused by random reporting of the assistant information by the UE is reduced by introducing the prohibit timer to determine the reporting time for the assistant information. Once the reporting time is determined, the assistant information is reported for DRX groups with a reporting need, and the assistant information is not reported for DRX groups having no reporting need.

In some examples, the timing duration of the prohibit timer may be associated with the duration of the DRX cycle, for example, the timing duration of the prohibit timer may be an integral multiple of the DRX cycle, and the prohibit timer is set to expire within the onDuration time of the DRX cycle. In this way, the UE may complete the reporting of the assistant information within the activation time of the DRX cycle, instead of being woken up from a sleep state due to the expiration of the prohibit timer when the UE is in the sleep time of the DRX cycle and then performing the reporting of the assistant information, such that the power consumption of the terminal may be further reduced.

The reporting of the assistant information may be a triggering event for the start of the prohibit timer. The reporting of the assistant information may not be allowed within the timing range of the prohibit timer, and next reporting of the assistant information is performed after the prohibit timer expires.

In some examples, S100 may include:
in response to the at least two DRX groups sharing one prohibit timer, the reporting time for the DRX groups with the assistant information needing to be reported is determined according to at least one of a DRX configuration updating requirement of the DRX groups and the timing of the shared prohibit timer.

In response to at least two DRX groups sharing one prohibit timer, the reporting time for the assistant information and DRX groups having assistant information to be reported are determined according to at least one of the DRX configuration updating requirement of the DRX groups and the timing of the prohibit timer.

For example, determining, in response to the at least two DRX groups sharing one prohibit timer, the reporting time for the DRX groups with the assistant information needing to be reported according to at least one of the DRX configuration updating requirement of the DRX groups and the timing of the shared prohibit timer includes:
in response to the at least two DRX groups sharing one prohibit timer and a DRX configuration for at least one DRX group needing to be updated, determining current time as the reporting time for the DRX groups with the assistant information needing to be reported, and determining expiration time of the prohibit timer as the reporting time for the rest of the DRX groups with the assistant information needing to be reported.

Since the assistant information for the DRX group that previously has the DRX configuration updating requirement is reported when there is the DRX configuration updating requirement, the assistant information for the DRX group is reported when the prohibit timer expires. It is certain that the assistant information for the rest of the DRX groups is also reported after the prohibit timer expires and when the DRX configurations for the rest of the DRX groups need to be updated.

In some examples, determining, in response to the at least two DRX groups sharing one prohibit timer, the reporting time for the DRX groups with the assistant information needing to be reported according to at least one of the DRX configuration updating requirement of the DRX groups and the timing of the shared prohibit timer includes at least one of the following:
in response to the at least two DRX groups sharing one prohibit timer and the DRX configuration for each DRX group needing to be updated, current time is determined as the reporting time for the DRX groups with the assistant information needing to be reported; and
in response to the at least two DRX groups sharing one prohibit timer and the DRX configuration for at least one DRX group does not need to be updated, expiration time of the prohibit timer is determined as the reporting time for the DRX groups with the assistant information needing to be reported.

The UE may determine whether there is a DRX configuration updating requirement according to at least one of data reporting requirements and energy storage conditions of the UE. For example, the UE determines whether to adjust the DRX configurations for the DRX groups (that is, whether the DRX configurations for the one or more DRX groups in the UE need to be updated) according to the quantity of data cached by the UE, so as to report accumulated data as soon as possible to reduce the data overflow caused by too much cache data.

For another example, the UE may determine whether to adjust the DRX cycle of the DRX groups according to the urgency of the service corresponding to the data cached by the UE. For example, service corresponding to current cached data is so urgent that a security accident or other issues may be caused if the data are not reported. For example, a smart meter finds abnormal power consumption by detecting a current, and a power accident may occur if the condition is not reported as soon as possible. In this case, the smart meter may determine that power consumption data cached by the smart meter are so urgent. The UE may enter an onDuration state as soon as possible by shorting the sleep time in the DRX configuration to complete reporting of the urgent data.

Since the power consumption of the UE in the onDuration state is greater than the power consumption of the UE in the sleep state, the UE may also determine whether to update the current DRX configuration according to the storage condition of the UE.

For example, in response to the UE entering a low battery state where a battery level is already lower than a first battery level threshold, the UE may determine that the sleep time in the DRX configuration that enables the UE to be in the sleep state needs to be prolonged, for example, prolonging the sleep time within the DRX cycle of the one or more DRX groups. In this case, the UE determines that the DRX configuration for the one or more DRX groups needs to be updated.

For another example, in response to the UE exiting from the low battery state after being charged and entering a high battery state with the battery level higher than a second battery level threshold, the immediacy of data transmission is more important for the UE, and it is expected to prolong the onDuration time in the DRX configuration that enables the UE to be in the onDuration state. In this case, the UE determines that the DRX configuration for the one or more DRX groups needs to be updated.

In a word, in the example of the present disclosure, whether a DRX configuration for a DRX group needs to be updated may be applied to various application scenarios correspondingly, and may be determined by the UE, and the specific implementation is not limited here.

In some examples, determining the reporting time for the DRX groups with the assistant information needing to be reported according to timing of the prohibit timer includes:
   determining, in response to different DRX groups using different prohibit timers, the expiration time of the corresponding prohibit timers as the reporting time for the corresponding DRX groups.

Since different DRX groups use different prohibit timers, which means that each DRX group is provided with an independent prohibit timer, an m-th DRX group has assistant information to be reported when an m-th prohibit timer expires.

In some examples, the timing duration of the prohibit timer may be configured by the base station or pre-specified via a communication protocol. In response to the prohibit timer being configured by the base station, the base station may send configuration information for the prohibit timer to the UE via a broadcast message or an RRC message. The configuration information for the prohibit timer may indicate at least one of the following:
   a configuration manner of the prohibit timer, for example, whether the currently configured prohibit timer is a public prohibit timer shared by the more than one DRX groups, or is an independent prohibit timer configured for one DRX group;
   the timing duration of the prohibit timer; and
   start time of the prohibit timer.

In some examples, the assistant information is configured to indicate at least one of the following:
   duration information of onDuration time in a DRX cycle; and
   timing information of an Inactivity Timer.

The Inactivity Timer may be configured to prolong the duration of the onDuration time in the DRX cycle. During timing of the Inactivity Timer, the UE may be in an activation state even if the corresponding onDuration time of the DRX cycle expires, so as to perform data transceiving with the base station. Typical Inactivity Timers include, but are not limited to, the above DRX Inactivity Timer.

Figure 6:
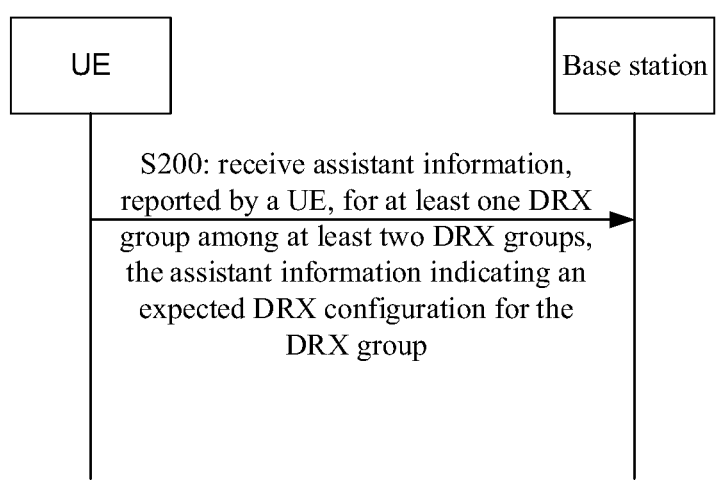
FIG. 6 is a schematic flow diagram of an information processing method according to an example of the present disclosure.

As shown in FIG. 6, there is provided an information processing method according to an example. The information processing method is performed by a base station, and includes:
   S200: assistant information, reported by a UE, for at least one DRX group among at least two DRX groups is received. The assistant information indicates an expected DRX configuration for the DRX group.

The base station may be various types of base stations, such as an evolved base station (eNB) or a next-generation base station (gNB).

The base station may receive the assistant information for one or more DRX groups reported in response to two or more DRX groups being configured in the UE.

The assistant information directly or indirectly indicates the expected DRX configuration for the UE. After receiving the assistant information, the base station may update a DRX configuration for one or more DRX groups in the UE later by referring to the assistant information. In this way, the base station may take at least one of the data transmission requirements and power consumption requirements, etc. in the UE into consideration for the DRX configuration for one or more DRX groups of the UE, and the DRX configuration for the UE is more in line with the requirements of a terminal.

In some examples, the assistant information is reported in an explicit value manner or in an increment manner. The explicit value manner is a manner in which the assistant information indicates a value of the DRX configuration. The increment manner is a manner in which the assistant information indicates an increment value of the DRX configuration.

Whether the UE reports the assistant information in the explicit value manner or the increment manner may be negotiated by the base station and the UE in advance, or randomly selected by the UE. The base station decodes the assistant information in the two manners separately, and determines the manner in which the UE reports the assistant information based on a correct decoding manner. For example, the explicit value manner and the increment value manner correspond to different information formats, the base station blindly decodes the assistant information via the two information formats, and the manner corresponding to the information format used when decoding succeeds is the manner adopted by the UE to report the assistant information.

For example, the value of the DRX configuration in the assistant information reported in the increment manner is small, while the value of the DRX configuration reported in the explicit value manner is great. After decoding the assistant information, the base station may determine the manner adopted by the UE to report the assistant information according to the characteristics of the values carried by the assistant information.

In some examples, S200 may include: receiving a first message, a second message or a third message carrying the assistant information reported by the UE. The first message includes the assistant information for all the DRX groups of the UE. The second message includes more than one reporting field and carries the assistant information for at least one DRX group of the UE, where each reporting field is configured to carry the assistant information for one DRX group. Each third message is configured to carry the assistant information for one DRX group of the UE.

In some examples, there may be more than one message for reporting the assistant information, for example, the above first message, second message, and third message.

The first message may be a message for the UE to report the assistant information for all the DRX groups included in the UE at one time.

The second message may be a message carrying more than one reporting fields, and each reporting field may be configured to report the assistant information for one DRX group.

The third messages are independent messages. In general, different DRX groups correspond to different third messages.

In response to the UE including a large quantity of DRX groups and the quantity of DRX groups with the assistant information needing to be reported being small, the UE reports the assistant information via the third messages among the first message, the second message and the third messages.

In some examples, the method further includes:
   in response to a reporting field of the second message being null or a predetermined value, it is determined that a current DRX configuration for a DRX group corresponding to the reporting field being null or the predetermined value is expected to be cancelled;

or, in response to a reporting field of the second message being null or a predetermined value, it is determined that a current DRX configuration for a DRX group corresponding to the reporting field being null or the predetermined value is expected to be maintained.

In this way, the base station may determine whether the UE expects to maintain or cancel a current DRX configuration for a corresponding DRX group in response to a certain reporting field of the second message being null or a predetermined value according to an agreement with the UE, provisions in a communication protocol, or an instruction issued by the base station to the UE.

In some examples, the method further includes: determining the DRX groups to which the assistant information carried by the second message belongs according to an identifier indication bit capable of being included in the second message.

In response to the assistant information being reported via the second message, the second message may carry the identifier indication bit. The identifier indication bit indicates the DRX groups to which the assistant information carried by the current second message belongs.

In some examples, determining the DRX groups to which the assistant information carried by the second message belongs according to the identifier indication bit capable of being included in the second message includes: determining that the assistant information carried by the second message belongs to a first DRX group in response to the identifier indication bit being a default value, the second message carrying no identifier indication bit, or the identifier indication bit being a group identifier for the first DRX group of the UE; and determining that the assistant information carried by the second message belongs to a second DRX group in response to the identifier indication bit being a group identifier for the second DRX group of the UE.

Figure 7:
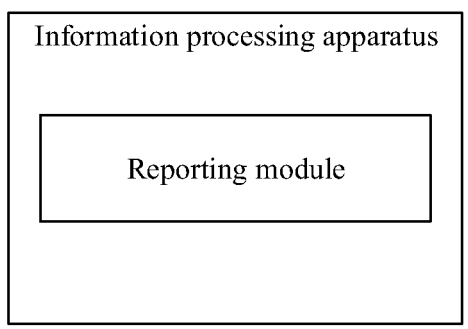
FIG. 7 is a schematic structural diagram of an information processing apparatus according to an example of the present disclosure.

As shown in FIG. 7, there is provided an information processing apparatus according to an example of the present disclosure. The information processing apparatus is applied to a user equipment (UE), and includes:

a reporting module, configured to report assistant information for at least one Discontinuous Reception (DRX) group among at least two DRX groups. The assistant information indicates an expected DRX configuration for the DRX group.

In some examples, the reporting module may be a program module. The program module may implement reporting of the assistant information after being executed by a processor.

In other examples, the reporting module may be a combination of software and hardware. The combination of software and hardware may include various programmable arrays. The programmable arrays include but are not limited to complex programmable arrays or field programmable arrays.

In further other examples, the reporting module may be a pure hardware module, such as an application specific integrated circuit.

In some examples, the reporting module is configured to report the assistant information for the at least one DRX group among the at least two DRX groups in an explicit value manner, where the explicit value manner is a manner in which the assistant information indicates a value of the DRX configuration; or, report the assistant information for the at least one DRX group among the at least two DRX groups in an increment manner, where the increment manner is a manner in which the assistant information indicates an increment value of the DRX configuration.

In some examples, the reporting module is configured to execute one of the following:

reporting the assistant information for all the DRX groups at one time via a first message;

reporting the assistant information for at least one DRX group via a second message including more than one reporting fields, where each reporting field is configured to carry assistant information for one DRX group; and reporting the assistant information for different DRX groups via different third messages respectively.

In some examples, in response to a current DRX configuration for one DRX group being not the expected DRX configuration, a corresponding reporting field of the second message carries the assistant information;

or, in response to a current expected DRX configuration for one DRX group being different from a DRX configuration indicated by the assistant information reported last time, a corresponding reporting field of the second message carries the assistant information;

or, in response to current reporting being the first reporting for one DRX group, a corresponding reporting field of the second message carries the assistant information;

or, in response to a current DRX configuration for one DRX group being expected to be cancelled, a corresponding reporting field in the second message is null or a predetermined value;

or, in response to a current DRX configuration for one DRX group being expected to be maintained, a corresponding reporting field in the second message is null or a predetermined value.

In some examples, the reporting module is configured to report the assistant information for different DRX groups respectively via the second message capability of carrying an identifier indication bit. The identifier indication bit is configured to indicate the DRX groups with the assistant information being reported.

In some examples, the DRX groups include a first DRX group and a second DRX group.

In response to the assistant information carried by the second message belonging to the first DRX group, the identifier indication bit included in the second message is a default value, the second message carries no identifier indication bit, or the identifier indication bit included in the second message is a group identifier for the first DRX group.

In response to the assistant information carried by the second message belonging to the second DRX group, the identifier indication bit included in the second message is a group identifier for the second DRX group.

In some examples, the apparatus further includes:

a determining module, configured to determine, according to timing of a prohibit timer, a reporting time for the DRX groups with the assistant information needing to be reported.

In some examples, the determining module is configured to determine, in response to the at least two DRX groups sharing one prohibit timer, the reporting time for the DRX groups with the assistant information needing to be reported according to at least one of a DRX configuration updating requirement of the DRX groups and the timing of the shared prohibit timer.

In some examples, the determining module is configured to; in response to the at least two DRX groups sharing one prohibit timer and a DRX configuration for at least one DRX group needing to be updated, determine current time as the reporting time for the DRX groups with the assistant information needing to be reported and determine an expiration time of the prohibit timer as the reporting time for the rest of the DRX groups with the assistant information needing to be reported.

In some examples, the determining module is further configured to perform at least one of the following: determining, in response to the at least two DRX groups sharing one prohibit timer and the DRX configuration for each DRX group needing to be updated, current time as the reporting time for the DRX groups with the assistant information needing to be reported; and, determining, in response to the at least two DRX groups sharing one prohibit timer and the DRX configuration for at least one DRX group not needing to be updated, expiration time of the prohibit timer as the reporting time for the DRX groups with the assistant information needing to be reported.

In some examples, the determining module is configured to determine, in response to different DRX groups using different prohibit timers, expiration time of the corresponding prohibit timers as the reporting time for the corresponding DRX groups.

In some examples, the assistant information is configured to indicate at least one of the following:
  duration information of onDuration time in a DRX cycle; and
  timing information of an Inactivity Timer.

Figure 8:
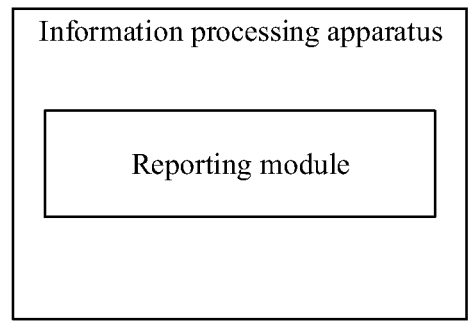
FIG. 8 is a schematic structural diagram of an information processing apparatus according to an example of the present disclosure.

As shown in FIG. 8, there is provided an information processing apparatus according to an example. The information processing apparatus is applied to a base station, and includes:
  a receiving module, configured to receive assistant information, reported by a UE, for at least one DRX group among at least two DRX groups, the assistant information indicating an expected DRX configuration for the DRX group.

In some examples, the receiving module may be a program module. The program module may implement receiving of the assistant information after being executed by a processor.

In other examples, the receiving module may be a combination of software and hardware. The combination of software and hardware may include various programmable arrays. The programmable arrays include but are not limited to complex programmable arrays or field programmable arrays.

In further other examples, the receiving module may be a pure hardware module, such as an application specific integrated circuit.

In some examples, the assistant information is reported in an explicit value manner or in an increment manner.

The explicit value manner is a manner in which the assistant information indicates a value of the DRX configuration.

The increment manner is a manner in which the assistant information indicates an increment value of the DRX configuration.

In some examples, the receiving module is configured to receive a first message, a second message or a third message carrying the assistant information reported by the UE.

The first message includes the assistant information for all the DRX groups of the UE.

The second message includes more than one reporting fields and carries the assistant information for at least one DRX group of the UE. Each reporting field is configured to carry the assistant information for one DRX group.

Each third message is configured to carry the assistant information for one DRX group of the UE.

In some examples, the apparatus further includes:
  a first determining module, configured to determine, in response to a reporting field of the second message being null or a predetermined value, that a current DRX configuration for a DRX group corresponding to the reporting field being null or the predetermined value is expected to be cancelled; or, determine, in response to a reporting field of the second message being null or a predetermined value, that a current DRX configuration for a DRX group corresponding to the reporting field being null or the predetermined value is expected to be maintained.

In some examples, the apparatus further includes:
  a second determining module, configured to determine DRX groups to which the assistant information carried by the second message belongs according to an identifier indication bit capable of being included in the second message.

In some examples, the second determining module is configured to determine that the assistant information carried by the second message belongs to a first DRX group in response to the identifier indication bit being a default value, the second message carrying no identifier indication bit, or the identifier indication bit being a group identifier for the first DRX group of the UE; and
  determine that the assistant information carried by the second message belongs to a second DRX group in response to the identifier indication bit being a group identifier for the second DRX group of the UE.

In order to meet the requirements for single-user peak rate and improvement of system capacity, the feature of Carrier Aggregation (CA) is introduced in R10 of LTE. The carrier aggregation may be divided into continuous carrier aggregation and non-continuous carrier aggregation. The UE needs only one RF chain for continuous carrier aggregation, but different RF chains for different frequency bands of non-continuous carrier aggregation. As a result, different DRX groups may be set according to different RF chains used by the UE. The different DRX groups share one DRX configuration, for example, different onDuration Timers and DRX Inactivity Timers are used. However, the onDuration Timers are aligned. Different short cycle parameters such as shortDRX-Cycle and drxShortCycleTimer may also be used. In general, a DRX group 1 is used for an FR chain 1, and a DRX group 2 is used for an FR chain 2, that is, the DRX group 1 and the DRX group 2 are used for low and high frequency bands respectively. Reporting of the assistant information for the DRX configuration (such as a DRX cycle (C-DRX)) expected by the UE is introduced in a power saving project, however, the assistant information is only for a current scenario with a single DRX group, not for a scenario with two newly introduced DRX groups. As a result, improvement of the assistant information needs to be considered.

In order to meet the requirements for single-user peak rate and improvement of system capacity, the feature of carrier aggregation (CA) is introduced to LTE. The carrier aggregation may be divided into continuous carrier aggregation and non-continuous carrier aggregation. The UE needs only one RF chain for continuous carrier aggregation, but different RF chains for different frequency bands of non-continuous carrier aggregation. As a result, different DRX groups may be set according to different RF chains used by the UE. The different DRX groups share one DRX configuration, for example, different onDuration Timers and DRX Inactivity Timers are used. However, the onDuration Timers are aligned. Different DRX short cycles such as shortDRX-Cycle and drxShortCycleTimer may also be used. In general, a DRX group 1 is used for FR 1, and a DRX group 2 is used for FR 2, that is, the DRX group 1 and the DRX group 2 are used for low and high frequency bands respectively. Reporting of the assistant information for the C-DRX configuration expected by the UE is introduced in a power saving project, however, the assistant information is only for a current scenario with a single DRX group, not for a scenario with two newly introduced DRX groups. In view of this, there is provided a DRX configuration processing method according to an example, and the DRX configuration processing method may include:

the UE reports assistant information for two DRX groups or assistant information for one of the DRX groups.

In some scenarios, the UE reports the assistant information for the two DRX groups or the assistant information for one of the DRX groups in an explicit value manner. For example, an expected onDuration duration of 20 ms and an InactivityTimer of 40 ms for DRX group 1 as well as an expected onDuration duration of 10 ms and an Inactivity-Timer of 20 ms for DRX group 2 may be reported at the same time.

In some scenarios, different messages may be configured to distinguish reports, or indication bits may be configured to distinguish reports in the same message.

In other scenarios, two new messages are defined, one for reporting the assistant information for the DRX group 1 and the other for reporting the assistant information for the DRX group 2. Or, which group the assistant information is used for is indicated in the same message respectively. Or, in response to there being no indication, the network defaults that the assistant information is used for the DRX group 1, and in response to there being an indication, the network considers that the assistant information is used for the DRX group 2 after receiving the indication.

In some scenarios, the UE may report the assistant information for the two DRX groups or the assistant information for one of the DRX groups in an increment manner. Increments may be reported separately for the two DRX groups, or may be used for the two DRX groups at the same time.

In some scenarios, in response to the UE reporting the assistant information for a certain DRX group via the same message, it means that another DRX group reports a null field.

For an example, reporting the null field for another DRX group means that the UE has no new report for another DRX group, and in this case, the network may determine that an original configuration is maintained. The original configuration here may be a current DRX configuration or an initial DRX configuration for the DRX group.

For another example, reporting the null field for another DRX group means that the UE does not expect to save power for another DRX group. In this case, the network may determine that the UE may expect to cancel one original configuration.

In some scenarios, the UE may report the assistant information for the two DRX groups by sharing one prohibit timer. The prohibit timer is configured to trigger the reporting of the assistant information.

In some scenarios, as long as one DRX group needs to be updated, reporting may be triggered, and the reporting for the other DRX group needs to wait until the timer expires.

For an example, the reporting of the assistant information is triggered only when the DRX configurations for both the DRX groups are updated at the same time.

In some scenarios, the UE may report the assistant information for the two DRX groups via independent prohibit timers, that is, the reporting of the assistant information for the two DRX groups is triggered completely independently, and the reporting of the assistant information for the two DRX groups do not interfere with each other.

Figure 9:
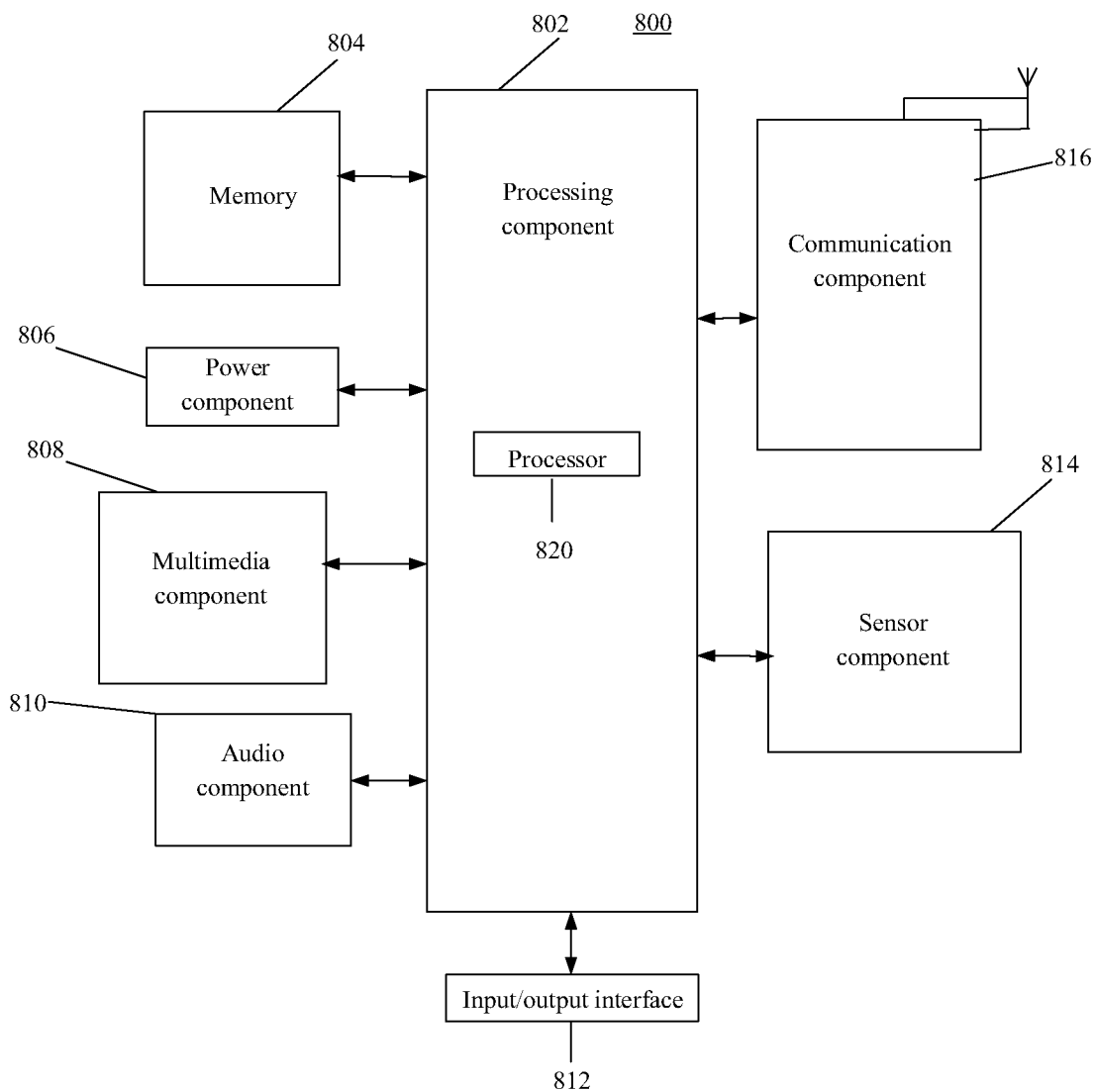
FIG. 9 is a schematic structural diagram of a terminal according to an example of the present disclosure.

FIG. 9 is a UE according to an example. The UE may be a mobile phone, a computer, digital broadcasting UE, a messaging device, a game console, a tablet device, a medical device, a fitness device, a personal digital assistant, etc.

Referring to FIG. 9, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls overall operations of the UE 800, such as operations associated with display, telephone calls, data communications, camera operations, and recording operations. The processing component 802 may include one or more processors 820 to execute instructions to complete all or part of the steps of the above methods. In addition, the processing component 802 may include one or more modules to facilitate interactions between the processing component 802 and other components. For example, the processing component 802 may include a multimedia module to facilitate interactions between the multimedia component 808 and the processing component 802.

The memory 804 is configured to store various types of data to support the operations of the UE 800. Instances of such data include instructions for any application or method operating on the UE 800, contact data, phone book data, messages, pictures, videos, etc. The memory 804 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 806 provides power for various components of the UE 800. The power component 806 may include a power management system, one or more power supplies, and other components associated with generating, managing, and distributing power to the UE 800.

The multimedia component 808 includes a screen that provides an output interface between the UE 800 and a user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touch, swiping, and gestures on the touch panel. The touch sensor may not only sense a boundary of a touch or swiping action, but also detect duration and pressure related to a touch or swiping operation. In some examples, the multimedia component 808 includes at least one of a front camera and a rear camera. When the UE 800 is in an operation mode, such as a shooting mode or a video mode, at least one of the front camera and the rear camera may receive external multimedia data. Each of the front camera and the rear camera may be a fixed optical lens system or has a focal length and optical zoom capabilities.

The audio component 810 is configured to output and/or input audio signals. For example, the audio component 810 includes a microphone (MIC), and when the UE 800 is in an operation mode, such as a call mode, a recording mode, or a voice recognition mode, the microphone is configured to receive external audio signals. The received audio signals may be further stored in the memory 804 or transmitted via the communication component 816. In some examples, the audio component 810 further includes a loudspeaker configured to output the audio signals.

The I/O interface 812 provides an interface between the processing component 802 and a peripheral interface module. The above peripheral interface module may be a keyboard, a click wheel, buttons, etc. These buttons may include, but are not limited to: a home button, a volume button, a start button, and a lock button.

The sensor component 814 includes one or more sensors configured to provide the UE 800 with various aspects of state assessment. For example, the sensor component 814 may detect an on/off state of the UE 800, and relative positioning of components, such as a display and a keypad of the UE 800. The sensor component 814 may also detect the position change of the UE 800 or a component of the UE 800, presence or absence of contact between the user and the UE 800, the orientation or acceleration/deceleration of the UE 800, and a temperature change of the UE 800. The sensor component 814 may include a proximity sensor configured to detect the presence of nearby objects when there is no physical contact. The sensor component 814 may also include an optical sensor, such as a CMOS or a CCD image sensor, for use in imaging applications. In some examples, the sensor component 814 may further include an acceleration sensor, a gyroscope sensor, a magnetic sensor, a pressure sensor, or a temperature sensor.

The communication component 816 is configured to facilitate wired or wireless communications between the UE 800 and other devices. The UE 800 may have an access to a wireless network based on a communication standard, such as WiFi, 2G, or 3G, or their combination. In an example, the communication component 816 receives broadcast signals or broadcast information from an external broadcast management system via broadcast channels. In an example, the communication component 816 further includes a near field communication (NFC) module to facilitate short-range communications. For example, the NFC module may be implemented based on radio frequency identification (RFID) technology, infrared data association (IrDA) technology, ultra-wideband (UWB) technology, Bluetooth (BT) technology and other technology.

In an example, the UE 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components to execute the above methods.

In an example, there is further provided a non-transitory computer-readable storage medium including instructions, such as the memory 804 including instructions. The above instructions may be executed by the processor 820 of the UE 800 to complete the above methods. For example, the non-transitory computer-readable storage medium may be an ROM, a random access memory (RAM), a CD-ROM, a magnetic tape, a floppy disk, an optical data storage device, etc.

Figure 10:
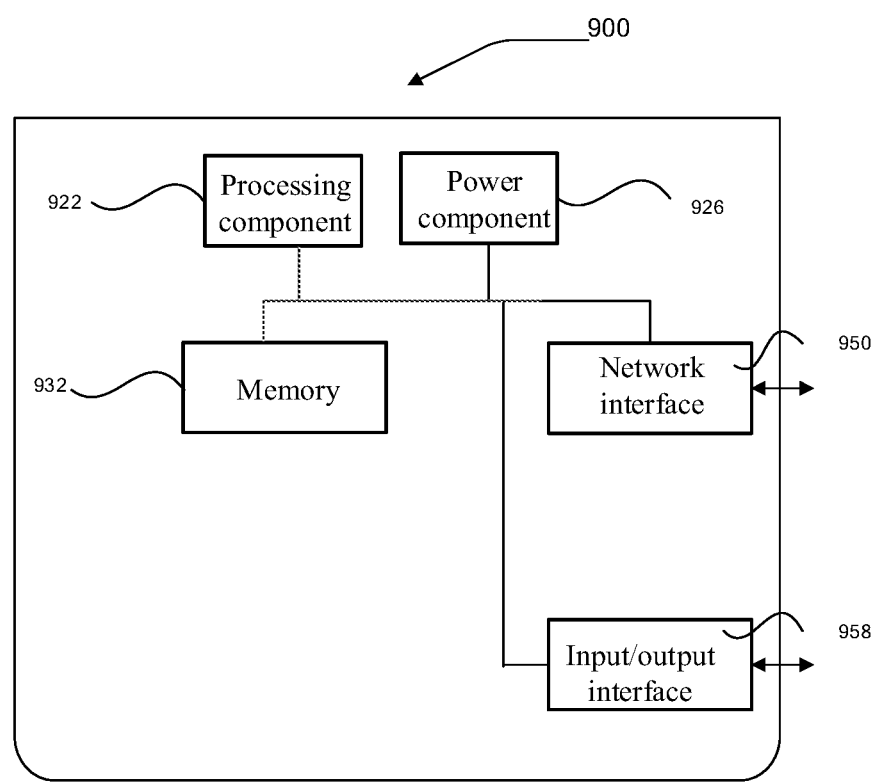
FIG. 10 is a schematic structural diagram of a base station according to an example of the present disclosure.

FIG. 10 is a schematic diagram of a base station. Referring to FIG. 10, the base station 900 includes: a processing component 922 which includes one or more processors; and memory resources represented by a memory 932, configured to store instructions executable by the processing component 922, such as applications. The applications stored in the memory 932 may include one or more modules, each of which corresponds to a set of instructions. In addition, the processing component 922 is configured to execute the instructions to execute any one of the information processing methods shown in FIGS. 3, 4A, 4B, 5 and 6.

The base station 900 may further include: a power component 926, configured to execute power management of the base station 900; a wired or wireless network interface 950, configured to connect the base station 900 to a network; and an input/output (I/O) interface 958. The base station 900 may be operated based on an operating system stored in the memory 932, such as Windows Server™, Mac OS X™, Unix™, Linux™, FreeBSD™ or the like.

There is provided a communication device according to an example of the present disclosure. The communication device may be a UE or a base station, and includes:
 a transceiver;
 a memory; and
 a processor, the processor is connected to the transceiver and the memory respectively, and is configured to control the transceiver to transmit and receive wireless signals by executing computer-executable instructions stored on the memory, and is able to implement the information processing method provided by any of the above examples, for example, to implement any one of the information processing methods shown in FIGS. 3, 4A, 4B, 5 and 6.

There is further provided a non-transitory computer-readable storage medium according to an example of the present disclosure. The non-transitory computer-readable storage medium stores computer-executable instructions. The computer-executable instructions are able to implement the information processing method provided by any of the above examples, for example, to implement any one of the information processing methods shown in FIGS. 3, 4A, 4B, 5 and 6, after being executed by a processor.

Additional non-limiting examples of the disclosure include the following examples.

In some examples, there is provided an information processing method performed by a user equipment (UE), including:
 reporting assistant information for at least one Discontinuous Reception (DRX) group among at least two DRX groups, the assistant information indicating an expected DRX configuration for the DRX group.

In some examples, reporting the assistant information for the at least one Discontinuous Reception (DRX) group among the at least two DRX groups includes:
 reporting the assistant information for the at least one DRX group among the at least two DRX groups in an explicit value manner, wherein the explicit value manner is a manner in which the assistant information indicates a value of the DRX configuration;
 or,
 reporting the assistant information for the at least one DRX group among the at least two DRX groups in an increment manner, wherein the increment manner is a manner in which the assistant information indicates an increment value of the DRX configuration.

In some examples, reporting the assistant information for the at least one Discontinuous Reception (DRX) group among the at least two DRX groups includes one of the following:

reporting the assistant information for all the DRX groups at one time via a first message;

reporting the assistant information for at least one DRX group via a second message including more than one reporting fields, wherein each reporting field is configured to carry the assistant information for one DRX group; and reporting the assistant information for different DRX groups via different third messages respectively.

In some examples, in response to a current DRX configuration for one DRX group being not the expected DRX configuration, a corresponding reporting field of the second message carries the assistant information;

or, in response to a current expected DRX configuration for one DRX group being different from a DRX configuration indicated by the assistant information reported last time, a corresponding reporting field of the second message carries the assistant information;

or, in response to current reporting being the first reporting for one DRX group, a corresponding reporting field of the second message carries the assistant information;

or, in response to a current DRX configuration for one DRX group being expected to be cancelled, a corresponding reporting field in the second message is null or a predetermined value;

or, in response to a current DRX configuration for one DRX group being expected to be maintained, a corresponding reporting field in the second message is null or a predetermined value.

In some examples, reporting the assistant information for the at least one DRX group via the second message including more than one reporting fields includes:

reporting the assistant information for the different DRX groups respectively via the second message capable of carrying an identifier indication bit, wherein the identifier indication bit is configured to indicate the DRX groups with the assistant information being reported.

In some examples, the DRX groups include a first DRX group and a second DRX group;

in response to the assistant information carried by the second message belonging to the first DRX group, the identifier indication bit included in the second message is a default value, the second message carries no identifier indication bit, or the identifier indication bit included in the second message is a group identifier for the first DRX group; and in response to the assistant information carried by the second message belonging to the second DRX group, the identifier indication bit included in the second message is a group identifier for the second DRX group.

In some examples, the information processing method further includes:

determining a reporting time for the DRX groups with the assistant information needing to be reported according to timing of a prohibit timer.

In some examples, determining the reporting time for the DRX groups with the assistant information needing to be reported according to the timing of the prohibit timer includes:

determining, in response to the at least two DRX groups sharing one prohibit timer, the reporting time for the DRX groups with the assistant information needing to be reported according to at least one of a DRX configuration updating requirement of the DRX groups and the timing of the shared prohibit timer.

In some examples, determining, in response to the at least two DRX groups sharing one prohibit timer, the reporting time for the DRX groups with the assistant information needing to be reported according to at least one of the DRX configuration updating requirement of the DRX groups and the timing of the shared prohibit timer includes:

in response to the at least two DRX groups sharing one prohibit timer and a DRX configuration for at least one DRX group needing to be updated, determining current time as the reporting time for the DRX groups with the assistant information needing to be reported and determining expiration time of the prohibit timer as the reporting time for the rest of the DRX groups with the assistant information needing to be reported.

In some examples, determining, in response to the at least two DRX groups sharing one prohibit timer, the reporting time for the DRX groups with the assistant information needing to be reported according to at least one of the DRX configuration updating requirement of the DRX groups and the timing of the shared prohibit timer includes at least one of the following:

determining, in response to the at least two DRX groups sharing one prohibit timer, current time as the reporting time for the DRX groups with the assistant information needing to be reported in response to the DRX configuration for each DRX group needing to be updated; and determining, in response to the at least two DRX groups sharing one prohibit timer and the DRX configuration for at least one DRX group does not need to be updated, expiration time of the prohibit timer as the reporting time for the DRX groups with the assistant information needing to be reported.

In some examples, determining the reporting time for the DRX groups with the assistant information needing to be reported according to the timing of the prohibit timer includes:

determining, in response to different DRX groups using different prohibit timers, expiration time of corresponding prohibit timers as the reporting time for corresponding DRX groups.

In some examples, the assistant information is configured to indicate at least one of the following:

duration information of onDuration time in a DRX cycle; and timing information of an Inactivity Timer.

In some examples, there is provided an information processing method performed by a base station, including:

receiving assistant information, reported by a UE, for at least one DRX group among at least two DRX groups, the assistant information indicating an expected DRX configuration for the DRX group.

In some examples, the assistant information is reported in an explicit value manner or in an increment manner;

the explicit value manner is a manner in which the assistant information indicates a value of the DRX configuration; and the increment manner is a manner in which the assistant information indicates an increment value of the DRX configuration.

In some examples, receiving the assistant information, reported by the UE, for the at least one DRX group among the at least two DRX groups includes:
- receiving a first message, a second message or a third message carrying the assistant information reported by the UE;
- the first message includes the assistant information for all the DRX groups of the UE;
- the second message includes more than one reporting fields and carries the assistant information for at least one DRX group of the UE, wherein each reporting field is configured to carry the assistant information for one DRX group; and
- each third message is configured to carry the assistant information for one DRX group of the UE.

In some examples, the information processing method further includes:
- determining, in response to a reporting field of the second message being null or a predetermined value, that a current DRX configuration for a DRX group corresponding to the reporting field being null or the predetermined value is expected to be cancelled;

or,
- determining, in response to a reporting field of the second message being null or a predetermined value, that a current DRX configuration for a DRX group corresponding to the reporting field being null or the predetermined value is expected to be maintained.

In some examples, the information processing method further includes:
- determining DRX groups which the assistant information carried by the second message belongs to according to an identifier indication bit capable of being included in the second message.

In some examples, determining DRX groups which the assistant information carried by the second message belongs to according to the identifier indication bit capable of being included in the second message includes:
- determining that the assistant information carried by the second message belongs to a first DRX group in response to the identifier indication bit being a default value, the second message carrying no identifier indication bit, or the identifier indication bit being a group identifier for the first DRX group of the UE; and
- determining that the assistant information carried by the second message belongs to a second DRX group in response to the identifier indication bit being a group identifier for the second DRX group of the UE.

In some examples, there is provided an information processing apparatus applied to a user equipment (UE), including:
- a reporting module, configured to report assistant information for at least one Discontinuous Reception (DRX) group among at least two DRX groups, the assistant information indicating an expected DRX configuration for the DRX group.

In some examples, the reporting module is configured to report the assistant information for the at least one DRX group among the at least two DRX groups in an explicit value manner, wherein the explicit value manner is a manner in which the assistant information indicates a value of the DRX configuration; or, report the assistant information for the at least one DRX group among the at least two DRX groups in an increment manner, wherein the increment manner is a manner in which the assistant information indicates an increment value of the DRX configuration.

In some examples, the reporting module is configured to execute one of the following:
- reporting the assistant information for all the DRX groups at one time via a first message;
- reporting the assistant information for at least one DRX group via a second message including more than one reporting fields, wherein each reporting field is configured to carry the assistant information for one DRX group; and
- reporting the assistant information for different DRX groups via different third messages respectively.

In some examples, in response to a current DRX configuration for one DRX group being not the expected DRX configuration, a corresponding reporting field of the second message carries the assistant information;

or,
- in response to a current expected DRX configuration for one DRX group being different from a DRX configuration indicated by the assistant information reported last time, a corresponding reporting field of the second message carries the assistant information;

or,
- in response to current reporting being the first reporting for one DRX group, a corresponding reporting field of the second message carries the assistant information;

or,
- in response to a current DRX configuration for one DRX group being expected to be cancelled, a corresponding reporting field in the second message is null or a predetermined value;

or,
- in response to a current DRX configuration for one DRX group being expected to be maintained, a corresponding reporting field in the second message is null or a predetermined value.

In some examples, the reporting module is configured to report the assistant information for different DRX groups respectively via the second message capable of carrying an identifier indication bit, wherein the identifier indication bit is configured to indicate the DRX groups with the assistant information being reported.

In some examples, the DRX groups include a first DRX group and a second DRX group;
- in response to the assistant information carried by the second message belonging to the first DRX group, the identifier indication bit included in the second message is a default value, the second message carries no identifier indication bit, or the identifier indication bit included in the second message is a group identifier for the first DRX group; and
- in response to the assistant information carried by the second message belonging to the second DRX group, the identifier indication bit included in the second message is a group identifier for the second DRX group.

In some examples, the information processing apparatus further includes:
- a determining module, configured to determine, according to timing of a prohibit timer, a reporting time for the DRX groups with the assistant information needing to be reported.

In some examples, the determining module is configured to determine, in response to the at least two DRX groups sharing one prohibit timer, the reporting time for the DRX groups with the assistant information needing to be reported according to at least one of a DRX configuration updating requirement of the DRX groups and the timing of the shared prohibit timer.

In some examples, the determining module is configured to: in response to the at least two DRX groups sharing one prohibit timer and the DRX configuration for at least one DRX group needing to be updated, determine current time as the reporting time for the DRX groups with the assistant information needing to be reported and determine expiration time of the prohibit timer as the reporting time for the rest of the DRX groups with the assistant information needing to be reported.

In some examples, the determining module is further configured to perform at least one of the following: determining, in response to the at least two DRX groups sharing one prohibit timer, current time as the reporting time for the DRX groups with the assistant information needing to be reported in response to the DRX configuration for each DRX group needing to be updated; and determining, in response to the at least two DRX groups sharing one prohibit timer and the DRX configuration for at least one DRX group does not need to be updated, expiration time of the prohibit timer as the reporting time for the DRX groups with the assistant information needing to be reported.

In some examples, the determining module is configured to determine, in response to different DRX groups using different prohibit timers, expiration time of corresponding prohibit timers as the reporting time for corresponding DRX groups.

In some examples, the assistant information is configured to indicate at least one of the following:
  duration information of onDuration time in a DRX cycle; and
  timing information of an Inactivity Timer.

In some examples, there is provided an information processing apparatus applied to a base station, including:
  a receiving module, configured to receive assistant information, reported by a UE, for at least one DRX group among at least two DRX groups, the assistant information indicating an expected DRX configuration for the DRX group.

In some examples, the assistant information is reported in an explicit value manner or in an increment manner;
  the explicit value manner is a manner in which the assistant information indicates a value of the DRX configuration; and
  the increment manner is a manner in which the assistant information indicates an increment value of the DRX configuration.

In some examples, the receiving module is configured to receive a first message, a second message or a third message carrying the assistant information reported by the UE;
  the first message includes the assistant information for all the DRX groups of the UE;
  the second message includes more than one reporting fields and carries the assistant information for at least one DRX group of the UE, wherein each reporting field is configured to carry the assistant information for one DRX group; and
  each third message is configured to carry the assistant information for one DRX group of the UE.

In some examples, the information processing apparatus further includes:
  a first determining module, configured to determine, in response to a reporting field of the second message being null or a predetermined value, that a current DRX configuration for a DRX group corresponding to the reporting field being null or the predetermined value is expected to be cancelled; or, determine, in response to a reporting field of the second message being null or a predetermined value, that a current DRX configuration for a DRX group corresponding to the reporting field being null or the predetermined value is expected to be maintained.

In some examples, the information processing apparatus further includes:
  a second determining module, configured to determine DRX groups which the assistant information carried by the second message belongs to according to an identifier indication bit capable of being included in the second message.

In some examples, the second determining module is configured to determine that the assistant information carried by the second message belongs to a first DRX group in response to the identifier indication bit being a default value, the second message carrying no identifier indication bit, or the identifier indication bit being a group identifier for the first DRX group of the UE; and
  determine that the assistant information carried by the second message belongs to a second DRX group in response to the identifier indication bit being a group identifier for the second DRX group of the UE.

According to the technical solutions provided by the examples of the present disclosure, in response to the UE being configured with more than one DRX groups, the UE may report assistant information for at least one DRX group among the more than one DRX groups, and the assistant information may provide reference for the base station to update DRX configurations for the UE after being reported. In this way, when the base station updates the DRX configurations for the UE subsequently, the expected DRX configuration reported by the UE via the assistant information based on its own consideration of the UE may be taken into consideration, so as to achieve a good balance between reduction of the power consumption of the UE and shortening of the data transmission latency of the UE.

Other examples of the present disclosure will be apparent to those skilled in the art from consideration of the description and practice of the disclosure disclosed here. The present disclosure is intended to cover any variations, uses, or adaptations of the present disclosure following the general principles of the present disclosure and including common general knowledge or customary technical means in the art that are not disclosed in the present disclosure. It is intended that the description and the examples be considered as examples, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope of the present disclosure. It is intended that the scope of the present disclosure only be limited by the appended claims.

What is claimed is:

1. A method for information processing performed by a user equipment (UE), the method comprising:
  reporting assistant information for at least one Discontinuous Reception (DRX) group among at least two DRX groups, the assistant information indicating an expected DRX configuration for the DRX group;
  wherein reporting the assistant information for the at least one Discontinuous Reception (DRX) group among the at least two DRX groups comprises:

reporting the assistant information for all the DRX groups at one time via a first message, reporting the assistant information for at least one DRX group via a second message comprising more than one reporting fields, wherein each reporting field is configured to carry the assistant information for one DRX group, or reporting the assistant information for different DRX groups via different third messages respectively.

2. The method according to claim 1, wherein reporting the assistant information for the at least one Discontinuous Reception (DRX) group among the at least two DRX groups comprises:

reporting the assistant information for the at least one DRX group among the at least two DRX groups in an explicit value manner, wherein the explicit value manner is a manner in which the assistant information indicates a value of the DRX configuration;

or, reporting the assistant information for the at least one DRX group among the at least two DRX groups in an increment manner, wherein the increment manner is a manner in which the assistant information indicates an increment value of the DRX configuration.

3. The method according to claim 1, wherein in response to a current DRX configuration for one DRX group being not the expected DRX configuration, a corresponding reporting field of the second message carries the assistant information;

or, in response to a current expected DRX configuration for one DRX group being different from a DRX configuration indicated by the assistant information reported last time, a corresponding reporting field of the second message carries the assistant information;

or, in response to current reporting being a first reporting for one DRX group, a corresponding reporting field of the second message carries the assistant information;

or, in response to a current DRX configuration for one DRX group being expected to be cancelled, a corresponding reporting field in the second message is null or a predetermined value;

or, in response to a current DRX configuration for one DRX group being expected to be maintained, a corresponding reporting field in the second message is null or a predetermined value.

4. The method according to claim 1, wherein reporting the assistant information for the at least one DRX group via the second message comprising more than one reporting fields comprises:

reporting the assistant information for the different DRX groups respectively via the second message capable of carrying an identifier indication bit, wherein the identifier indication bit is configured to indicate the DRX groups with the assistant information being reported.

5. The method according to claim 4, wherein the DRX groups comprise a first DRX group and a second DRX group;

in response to the assistant information carried by the second message belonging to the first DRX group, the identifier indication bit comprised in the second message is a default value, the second message carries no identifier indication bit, or the identifier indication bit comprised in the second message is a group identifier for the first DRX group; and in response to the assistant information carried by the second message belonging to the second DRX group, the identifier indication bit comprised in the second message is a group identifier for the second DRX group.

6. The method according to claim 1, further comprising:

determining a reporting time for the DRX groups with the assistant information needing to be reported according to timing of a prohibit timer.

7. The method according to claim 6, wherein determining the reporting time for the DRX groups with the assistant information needing to be reported according to the timing of the prohibit timer comprises:

determining, in response to the at least two DRX groups sharing one prohibit timer, the reporting time for the DRX groups with the assistant information needing to be reported according to at least one of a DRX configuration updating requirement of the DRX groups and the timing of the shared prohibit timer.

8. The method according to claim 7, wherein determining, in response to the at least two DRX groups sharing one prohibit timer, the reporting time for the DRX groups with the assistant information needing to be reported according to at least one of the DRX configuration updating requirement of the DRX groups and the timing of the shared prohibit timer comprises:

in response to the at least two DRX groups sharing one prohibit timer and the DRX configuration for at least one DRX group needing to be updated, determining current time as the reporting time for the DRX groups with the assistant information needing to be reported and determining expiration time of the prohibit timer as the reporting time for a remainder of the DRX groups with the assistant information needing to be reported.

9. The method according to claim 7, wherein determining, in response to the at least two DRX groups sharing one prohibit timer, the reporting time for the DRX groups with the assistant information needing to be reported according to at least one of the DRX configuration updating requirement of the DRX groups and the timing of the shared prohibit timer comprises at least one of:

determining, in response to the at least two DRX groups sharing one prohibit timer, current time as the reporting time for the DRX groups with the assistant information needing to be reported in response to the DRX configuration for each DRX group needing to be updated; or determining, in response to the at least two DRX groups sharing one prohibit timer and the DRX configuration for at least one DRX group does not need to be updated, expiration time of the prohibit timer as the reporting time for the DRX groups with the assistant information needing to be reported.

10. The method according to claim 6, wherein determining the reporting time for the DRX groups with the assistant information needing to be reported according to the timing of the prohibit timer comprises:

determining, in response to different DRX groups using different prohibit timers, expiration time of corresponding prohibit timers as the reporting time for corresponding DRX groups.

11. The method according to claim 1, wherein the assistant information is configured to indicate at least one of:
   duration information of on Duration time in a DRX cycle; and/or
   timing information of an Inactivity Timer.

12. A method for information processing performed by a base station, the method comprising:
   receiving assistant information, reported by a user equipment (UE), for at least one Discontinuous Reception (DRX) group among at least two DRX groups, the assistant information indicating an expected DRX configuration for the DRX group;
   wherein receiving the assistant information, reported by the UE, for the at least one DRX group among the at least two DRX groups comprises:
   receiving a first message, a second message or a third message carrying the assistant information reported by the UE;
   the first message comprises the assistant information for all the DRX groups of the UE;
   the second message comprises more than one reporting fields and carries the assistant information for at least one DRX group of the UE, wherein each reporting field is configured to carry the assistant information for one DRX group; and
   each third message is configured to carry the assistant information for one DRX group of the UE.

13. The method according to claim 12, wherein the assistant information is reported in an explicit value manner or in an increment manner;
   the explicit value manner is a manner in which the assistant information indicates a value of the DRX configuration; and
   the increment manner is a manner in which the assistant information indicates an increment value of the DRX configuration.

14. The method according to claim 12, further comprising:
   determining, in response to a reporting field of the second message being null or a predetermined value, that a current DRX configuration for a DRX group corresponding to the reporting field being null or the predetermined value is expected to be cancelled;
   or,
   determining, in response to a reporting field of the second message being null or a predetermined value, that a current DRX configuration for a DRX group corresponding to the reporting field being null or the predetermined value is expected to be maintained.

15. The method according to claim 12, further comprising:
   determining DRX groups which the assistant information carried by the second message belongs to according to an identifier indication bit capable of being comprised in the second message.

16. The method according to claim 15, wherein determining DRX groups which the assistant information carried by the second message belongs to according to the identifier indication bit capable of being comprised in the second message comprises:
   determining that the assistant information carried by the second message belongs to a first DRX group in response to the identifier indication bit being a default value, the second message carrying no identifier indication bit, or the identifier indication bit being a group identifier for the first DRX group of the UE; and
   determining that the assistant information carried by the second message belongs to a second DRX group in response to the identifier indication bit being a group identifier for the second DRX group of the UE.

17. A communication device, comprising:
   a transceiver;
   a memory; and
   one or more processors, collectively connected to the transceiver and the memory respectively, collectively configured to control the transceiver to transmit and receive wireless signals by executing computer-executable instructions on the memory, and capable of reporting assistant information for at least one Discontinuous Reception (DRX) group among at least two DRX groups, the assistant information indicating an expected DRX configuration for the DRX group;
   wherein the one or more processors is are further collectively configured to:
   report the assistant information for all the DRX groups at one time via a first message;
   report the assistant information for at least one DRX group via a second message comprising more than one reporting fields, wherein each reporting field is configured to carry the assistant information for one DRX group; or
   report the assistant information for different DRX groups via different third messages respectively.

18. A communication device, comprising:
   a transceiver;
   a memory that stores computer-executable instructions; and
   one or more processors, collectively connected to the transceiver and the memory respectively,
   wherein the computer-executable instructions, when collectively executed by the one or more processors, cause the communication device to act as the base station and perform the method according to claim 12.

* * * * *

UNITED STATES PATENT AND TRADEMARK OFFICE
CERTIFICATE OF CORRECTION

PATENT NO. : 12,408,231 B2
APPLICATION NO. : 17/778596
DATED : September 2, 2025
INVENTOR(S) : Yanhua Li Page 1 of 1

It is certified that error appears in the above-identified patent and that said Letters Patent is hereby corrected as shown below:

In the Claims

In Column 29, Line 3, in Claim 11, delete "on Duration" and insert -- onDuration --, therefor.
In Column 29, Line 4, in Claim 11, delete "and/or" and insert -- or --, therefor.
In Column 30, Line 31, in Claim 17, delete "is are" and insert -- are --, therefor.

Signed and Sealed this
Eighteenth Day of November, 2025

John A. Squires
*Director of the United States Patent and Trademark Office*